United States Patent [19]
Tawarayama et al.

[11] Patent Number: 5,764,661
[45] Date of Patent: Jun. 9, 1998

[54] LASER GLASSES AND LASER GLASS FIBERS

[75] Inventors: Hiromasa Tawarayama, Fussa; Hiroaki Yanagita, Hino; Katsuhisa Itoh, Ome; Hisayoshi Toratani, Tokyo, all of Japan

[73] Assignee: Hoya Corporation, Tokyo, Japan

[21] Appl. No.: 562,601

[22] Filed: Nov. 24, 1995

[30] Foreign Application Priority Data

Nov. 24, 1994 [JP] Japan ................................ 6-289355

[51] Int. Cl.$^6$ ........................... C03C 3/32; H01S 3/07
[52] U.S. Cl. .................. 372/6; 359/341; 385/123; 385/142; 501/37; 501/40; 501/140; 501/900
[58] Field of Search ................ 501/37, 40, 140, 501/900; 385/123, 141, 142, 144; 372/6; 359/341

[56] References Cited

U.S. PATENT DOCUMENTS

| | | | |
|---|---|---|---|
| 4,942,144 | 7/1990 | Martin | 501/40 |
| 5,378,664 | 1/1995 | Becker et al. | 501/40 |
| 5,392,376 | 2/1995 | Aitken et al. | 385/144 |

FOREIGN PATENT DOCUMENTS

| | | |
|---|---|---|
| 676 377 | 10/1995 | European Pat. Off. |
| 4-333029 | 11/1992 | Japan |
| 6-321574 | 11/1994 | Japan |
| 7-101749 | 4/1995 | Japan |
| 7-149538 | 6/1995 | Japan |

OTHER PUBLICATIONS

P.C. Becker et al., "$Pr^{3+}$:La–Ga–S Glass: A Promising Material for 1.3 μm Fiber Amplification", OSA, 1992, Postdealine Paper PD5, pp. 20–23 [no month].

D.W. Hewak et al., "Emission at 1.3 μm from dysprosium-doped Ga:LA:S glass", Electronics Letters, 9th Jun. 1994, vol. 30, No. 12, pp. 968–970.
S.Q. Gu et al., "Optical Characterization of $Er:As_2S_3$ glass", CLEO, 1994, Technical Digest Series, vol. 8, pp. 336–337, [no month].
Elias Snitzer et al., "Ge–GA–S Glass for 1.3 μm Amplifiers and Mask Fabrication of Gratings in $Ge-SiO_2$ Fibers", The 4th International Symposium on New Glass, 1993, pp. 57–69, [no month].
Marcel Palazzi, "CHIMIE MINÉRALE — Étude du Système $Ga_2S_3$–$Na_2S$. Mise en évidence d'une zone formatrice de verres", C. R. Acad. Sc. Paris, t. 299, Sèrie II, n° 9, 1984, pp. 529–32, [no month].
Journal of Non–Crystalline Solids, vol. 182, No. 3, Mar. 2, 1995, pp. 257–261, K. Wei et al, "$Pr^{3+}$–Doped Ge–Ga–S Glasses ...".
Verres et Refractaires, "Verres de sulfures de terres rares", vol. 35, No. 4, Aug. 1981, pp.671–674, J. Flahaut.
Solid State Ionics, "Vibrational spectra of the vitreous Ga2S3–Na2S system"; vol. 44, No. 1–2, 1990, pp. 81–86, S. Barnier et al. [no month].

*Primary Examiner*—John D. Lee
*Attorney, Agent, or Firm*—Burns, Doane, Swecker & Mathis, L.L.P.

[57] ABSTRACT

Disclosed are laser glasses composed of a Ga—Na—S glasses doped with one or more kinds of activating ions, laser glass fibers comprising a core and a clad wherein the core is composed of the above-mentioned laser glasses of the present invention and optical fiber amplifiers comprising a pumping source, a laser glass fiber and a means for introducing pumping light and signal light into the laser glass fiber wherein the laser glass fiber is the above-mentioned laser glass fiber of the present invention. The laser glasses of the present invention show high radiative quantum efficiency and host glass stability and can be produced easily.

41 Claims, 5 Drawing Sheets

LASER GLASSES AND LASER GLASS FIBERS

BACKGROUND OF THE INVENTION

1. Field of the Invention

The present invention relates to laser glasses, laser glass fibers utilizing the above laser glasses and optical fiber amplifiers utilizing the above laser glass fibers. The laser glasses of the present invention are useful as glasses for optical amplification at 1.3 μm region used for optical communication systems, up-conversion glasses for visible lasers, long wavelength laser glasses and the like.

2. Related Art

It has been known that, when crystals or glasses doped with rare earth ions are used as laser materials, non-radiative relaxation rate (Wnr) due to multiphonon relaxation is generally represented by the following equation:

$$Wnr = Wnr(0) \exp[-\alpha \cdot \Delta E/(\hbar\omega/2\pi)]$$

In the equation, Wnr(0) and α are constants inherent in materials, ΔE is an energy gap between an emission level and another level immediately below the emissoin level and $\hbar\omega/2\pi$ is a maximum phonon energy of glasses. Among these factors, it is $\hbar\omega/2\pi$ that predominantly influences on the Wnr of glasses. In other words, it can be said that, in glasses having a large $\hbar\omega/2\pi$, non-radiative relaxation rate becomes larger and radiative quantum efficiency is lowered.

On the other hand, because maximum phonon energy of glasses is decided according to transparency limit in long wavelength region of the glasses, glasses having a transparent limit at a longer wavelength show smaller maximum phonon energy. Hitherto, oxide glasses, fluoride glasses and the like have generally been used as laser materials. However, for the reason described above, when emission between levels of which ΔE is small is needed, i.e., when emission of a long wavelength is needed or when energy gap between an emission starting level and another level immediately below that level is small, there may be a disadvantage that sufficient radiative quantum efficiency cannot be obtained.

Chalcogenide glasses have a transparency limit wavelength at a longer wavelength compared with oxide glasses and fluoride glasses. Therefore, they have been known to have a smaller maximum phonon energy and it is possible to enhance radiative quantum efficiency by using these glasses.

Ga—La—S glasses which are chalcogenide glasses doped with rare earth ions have already been reported (P. C. Becker, M. M. Broder, V. G. Lambrecht, A. J. Bruce and G. Nykolak, OSA, 1992, Postdeadline Paper PD5, p20–23). This report describes that radiative quantum efficiency of Pr ions at 1.3 μm is about 15 times higher than that obtained by using fluoride glasses of $ZrF_4$ type (ZBLAN). Further, with respect to Dy ions of which fluorescence was not confirmed in ZBLAN, fluorescence at 1.3 μm was confirmed (Electron Lett., 1994, 30, p12). Therefore, Dy ions as well as Pr ions have been paid much attention. However, since this type of glasses do not have sufficient thermal stability, they are likely to crystallize and hence they have a drawback that it is difficult to reduce transmission loss when they are made into fibers.

As—S glasses (S. Q. Gu, Q. Xu, S. Ramachandran, E. E. Reuter, J. T. Verdeyen, S. G. Bishop, CLEO, 1994, Technical Digest Series, Volume 8, p336) have drawbacks of poor uniformity of glass and the like due to low solubility of rare earth ions in the glasses. Ge—Ga—S glasses (E. Snitzer, K. Wei and Prohaska, The 4th International Symposium on New Glass, 1993, p57) also have a drawback of poor glass stability and have not been made into fibers. In addition, chalcogenide glasses have drawbacks that their production requires many complex process steps and it is difficult to obtain them in a large size because they show high vapor pressure and hence starting materials must generally be dissolved within vacuum-sealed glass ampoules.

Therefore, the first object of the present invention is to provide laser glasses showing high radiative quantum efficiency and high stability against crystallization, which can be easily produced.

The second object of the invention is to provide laser glass fibers and optical fiber amplifiers utilizing the laser glasses mentioned above. In particular, the present invention aims at providing optical fiber amplifiers which can efficiently operate at 1.3 μm region.

SUMMARY OF THE INVENTION

The first embodiment of the present invention relates to laser glasses composed of Ga—Na—S glasses doped with one or more kinds of activating ions.

The second embodiment of the present invention relates to laser glass fibers comprising a core and a clad, wherein the core is composed of the laser glasses of the present invention.

The third embodiment of the present invention relates to optical fiber amplifiers comprising a pumping source, a laser glass fiber and a means for introducing pumping light and signal light into the laser glass fiber, wherein the laser glass fiber is the laser glass fiber of the present invention.

DETAILED DESCRIPTION OF THE PREFERRED EMBODIMENTS

The present invention will be further explained in detail hereinafter.

Host glasses of the laser glasses according to the present invention are Ga—Na—S glasses. Since Ga—Na—S glasses (M. Palazzi, C. R. Acal. Sci. (Paris) Serie II, 299 (1984) 529) are transparent up to 12 to 13 μm, which is longer than those of fluoride glasses, they show lower maximum phonon energy. Further, they can have higher radiative quantum efficiency because of their low non-radiative relaxation rates. In addition, they can advantageously be formed as uniform glasses, because of high solubility of rare earth ions therein.

Ga ions constitute network of the glasses and Na ions essentially work as network modifier. They are contained in the glasses in amounts of 50 to 80 mol % and 5 to 45 mol %, respectively. With contents of these components out of the above-specified ranges, it is difficult to obtain stable glasses and the glasses become likely to crystallize. The glasses may contain S ions alone or S ions and, in addition, Cl ions as anions. Cl ions improve stability of the glasses. When the glasses contain Cl ions, content of Cl ions is preferably 15 mol % or less. When the content exceeds the limit, it becomes difficult to obtain stable glasses and the glasses become likely to crystallize.

The laser glasses of the present invention contain one or more kinds of activating ions in the host glasses described above. The activating ions are mainly selected from rare earth ions. Their examples are $Pr^{3+}$ (0.6, 1.0, 1.3 µm), $Nd^{3+}$ (0.9, 1.0, 1.3, 1.8 µm), $Sm^{3+}$ (0.6, 1.3 µm), $Eu^{3+}$ (0.6 µm), $Tb^{3+}$ (0.5 µm), $Dy^{3+}$ (1.3, 3.0 µm), $Ho^{3+}$ (0.7, 1.0, 1.2, 1.3, 1.4, 1.5, 1.7, 2.1, 2.4, 2.9, 3.9 µm), $Er^{3+}$ (0.7, 0.9, 1.3, 1.6, 1.7, 2.8 µm), $Tm^{3+}$ (2.0, 2.4 µm), $Yb^{3+}$ (1.0 µm) and the like. The parenthesized numbers indicate their main fluoresence wavelengths. Other than ions of rare earth elements, the activating ions may be selected from ions of transition metal elements.

Content of the activating ions are suitably selected within a range of from 0.01 to 40 mol % (in total, if two or more kinds of ions are used), provided that total of the contents of Ga, Na and activating ions is 100%. A content of the activating ions less than 0.01 mol % yields only low pumping efficiency because of too low ionic density of the activating ions for laser oscillation, optical amplification and the like and, as a result, strong pumping is required for excitation. On the other hand, if the content of the activating ions exceeds 40 mol %, the glasses become likely to crystallize and therefore a content of 40 mol % or less is preferred.

The laser glasses of the present invention may contain sensitizing ions together with the activating ions described above. Kinds of the sensitizing ions may be suitably selected depending on the activating ions. Combinations of the activating ions and the sensitizing ions are exemplified below. Parenthesized ions are the sensitizing ions and the ions before the parentheses are the activating ions.

$Nd^{3+}$ ($Ce^{3+}$, $Cr^{3+}$)
$Sm^{3+}$ ($Tb^{3+}$)
$Tb^{3+}$ ($Gd^{3+}$)
$Dy^{3+}$ ($Er^{3+}$),
$Ho^{3+}$ ($Cr^{3+}$, $Yb^{3+}$, $Er^{3+}$, $Tm^{3+}$),
$Er^{3+}$ ($Yb^{3+}$, $Cr^{3+}$)
$Tm^{3+}$ ($Cr^{3+}$, $Er^{3+}$, $Yb^{3+}$)
$Yb^{3+}$ ($Nd^{3+}$, $Cr^{3+}$)

Amount of the sensitizing ions to be added may suitably be decided depending on the activating ions and their amounts to be added, pumping efficiency and the like. Total of the contents of Ga, Na, activating ions and sensitizing ions in the laser glasses containing the sensitizing ions is 100%.

Additional cations may be introduced into the laser glasses of the present invention in order to improve stability against devitrification of the glasses or to modify properties of the glasses such as refractive index and glass transition temperature. Modification of glass properties is particularly important when the glasses are utilized in the form of fibers. Further, the glasses whose properties are modified as described above and not containing the activating ions may be used as clad glass of the fibers or the like.

Cations which may additionally be contained are listed below with their amounts in terms of mol %.
Li: 0–17%, K: 0–22%,
Mg: 0–12%, Ca: 0–17%, Sr: 0–17%,
Ba: 0–12%, Zn: 0–12%, Cd: 0–17%,
Sn: 0–17%, Pb: 0–17%,
Y: 0–12%, La: 0–40%, Ce: 0–37%,
Gd: 0–17%, Lu: 0–12%, Al: 0–12%,
In: 0–12%,
Ti: 0–12%, Zr: 0–12% , Si: 0–12%
Ge: 0–17%.

Among these cations, ions which act to improve stability against devitrification of the glasses are Li, K, Ca, Sr, Cd, Sn, Pb, La, Ce, Gd, Lu, Ge and the like.

Further, refractive index may be varied by introducing the ions mentioned above. For example, refractive index may be increased by replacing a part of Na with K, Mg, Ca, Sr, Ba, Y, La, Gd, Zn, Cd, Al, In, Si, Sn, Pb ions or the like. Refractive index may be decreased by replacing a part of Ga with Li, K, Mg, Ca, Al ions or the like, or replacing a part of Na with Li.

Those additional cations may suitably be introduced in an amount within a range of from 0.01 to 45 mol % in their total. When the amount of the additional cations is less than 0.01 mol %, improvement of stability against devitrification and influence on the properties would not be significant. When it exceeds 45%, the glasses become likely to crystallize and thus such an amount is not preferred. Total of contents of Ga, Na, activating ions and the cations, or Ga, Na, activating ions, sensitizing ions and the cations is 100%.

Preferred contents of the additional cations described above are as follows:
Li: 0–12%, K: 0–17%,
Mg: 0–7%, Ca: 0–12%, Sr: 0–12%,
Ba: 0–7%, Zn: 0–7%, Cd: 0–12%,
Sn: 0–12%, Pb: 0–12%,
Y: 0–7%, La: 0–35%, Ce: 0–30%,
Gd: 0–12%, Lu: 0–7%, Al: 0–7%,
In: 0–7%,
Ti: 0–7%, Zr: 0–7% , Si: 0–7%,
Ge: 0–12%.

Total content of the cations is preferably selected within a range of from 5 to 40 mol %. Also in such a case, total of contents of Ga, Na, activating ions and the cations, or Ga, Na, activating ions, sensitizing ions and the cations is 100%.

The laser glasses of the present invention may be obtained by heating and melting the mixture of sulfides of the various elements as starting materials, for example, in a carbon crucible under inert gas atmosphere and slowly quenching them. The glasses of the present invention are stable against crystallization and hence do not require rapid quenching and their vapor pressure is markedly lower than that of usual chalcogenide glasses. Therefore, they do not have to be vacuum-sealed by utilizing, for example, quartz ampoules when they are melted. They can be melted in a glove box like fluoride glasses. This makes it possible to reduce oxide content in the glasses with a sulfidizing agent such as hydrogen sulfide in order to lower the non-radiative relaxation rate, and to introduce an oxidative gas such as chlorine and oxygen gases with the inert gas in order to prevent reduction of Ga ions and the like.

When the glasses are intended to contain chlorine as an anion, the glasses containing sulfur and chlorine as anions can be obtained by heating and melting starting sulfides of the various elements under inert gas atmosphere containing a suitable amount (e.g. 3 to 10 mol %) of chlorine and slowly quenching them.

The laser glass fibers of the present invention comprise a core and a clad and the core is composed of the laser glasses of the present invention described above. The activating ions contained in the laser glasses of the cores may be suitably selected depending on intended applications where the laser glass fibers are used. For example, in the case of laser glass fibers for 1.3 μm region amplification, laser glasses containing one or more activating ions selected from the group consisting of Pr, Nd, Sm, Dy, Ho and Er, which have a fluorescence wavelength at 1.3 μm region, may be utilized as the laser glasses described above.

Materials for the clads of the laser glass fibers according to the present invention are not particularly limited. However, when thermal characteristics such as glass transition temperature, thermal expansion coefficient and viscosity curve, chemical reactions at the interface between clad and core, refractive index and the like are considered, preferably used are Ga—Na—S glasses the same as those used as host glasses of the laser glasses according to the present invention but not containing activating ions, other chalcogenide glasses and oxychalcogenide glasses.

The laser glass fibers of the present invention can be produced by conventional methods using the laser glasses of the present invention and suitable clad glasses. For example, rod-like preforms having a two-layer structure of core glass and clad glass are formed and then the rod-like preforms are subjected to be drawn into fibers. Shape and size of the fibers are not particularly limited. In general, they preferably have an outer diameter of 100 to 500 μm, a core diameter of 1 to 15 μm and a refractive index difference between core and clad (Δn) of 0.2 to 3.5%. However, they are not limited to the above-specified ranges and they may be suitably selected depending on the intended uses of the fibers and the like.

The optical fiber amplifiers of the present invention will be explained hereinafter.

The optical fiber amplifiers of the present invention can be used to amplify singal transmitted through a fiber. In optical fiber amplifiers, because signal light and pumping light are confined in a small core in the longitudinal direction, large amplification gain can be obtained even with a small gain coefficient by using long fibers.

The optical fiber amplifiers of the present invention comprise a pumping source, a laser glass fiber and a means for introducing pumping light and signal light into the laser glass fiber, wherein the laser glass fiber is that of the present invention. Optical fiber amplifiers are explained in detail in, for example, Japanese Patent Un-examined Publication Nos. 5-63285 (63285/1993) and 5-136516 (136516/1993). The optical fiber amplifiers of the present invention correspond to those conventional optical fiber amplifiers utilizing the laser glass fibers of the present invention.

In particular, optical fiber amplifiers utilizing laser glass fibers having cores composed of glasses doped with Pr or Dy ions are expected to be practically used as optical fiber amplifiers at 1.3 μm region. As described above, high gain can be obtained by utilizing the laser glasses of the present invention showing small maximum phonon energy.

Figure 6:
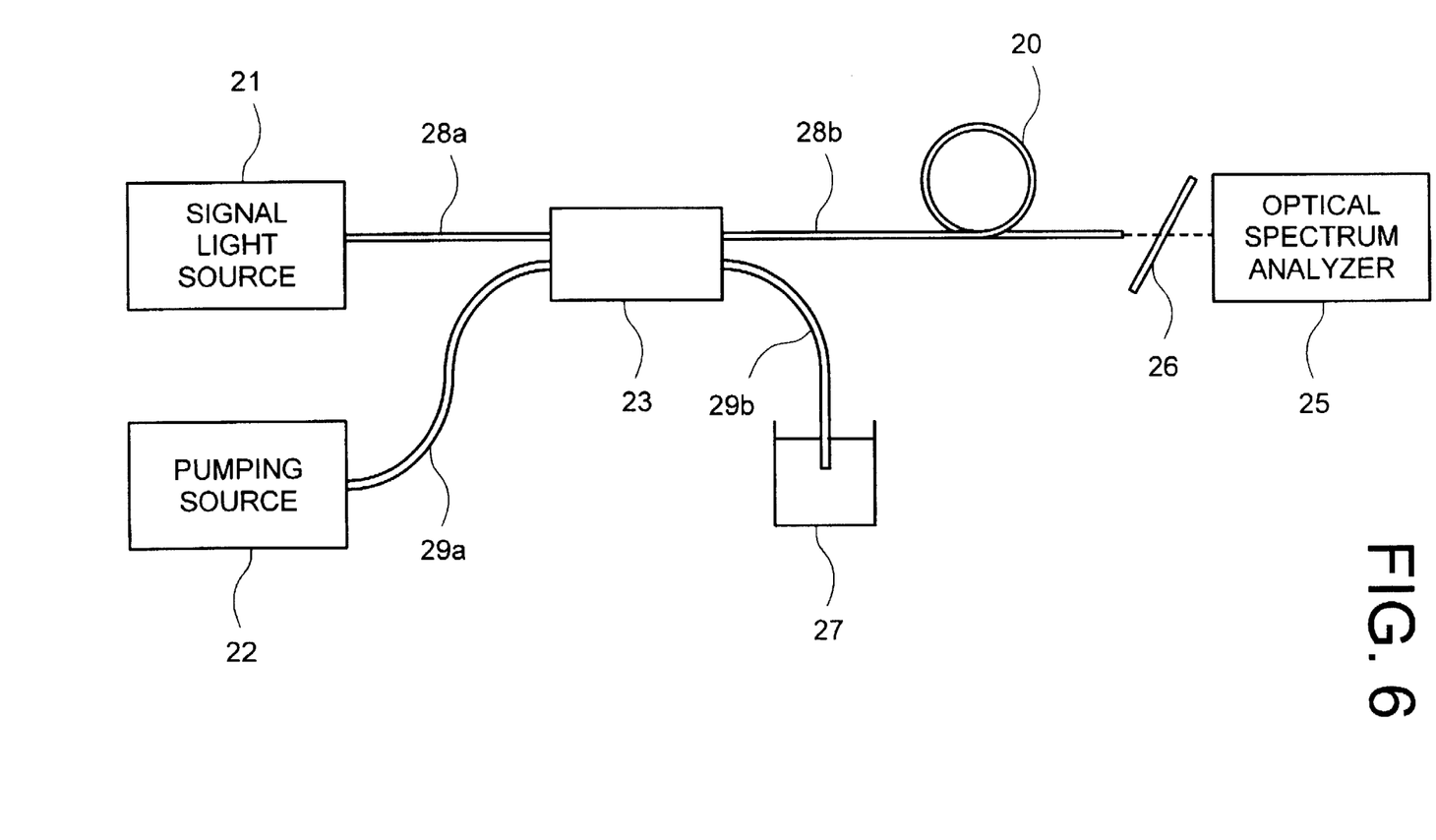
FIG. 6 illustrates an optical fiber amplifier of the present invention.

FIG. 6 shows an example of the optical fiber amplifier configuration utilizing the laser glass fiber 20 of the present invention. As shown in this figure, the optical fiber amplifier comprises a laser glass fiber 20 for amplifying signal light, a pumping laser source 22, and an optical fiber coupler 23, which is a means for introducing the pumping laser light and the signal light into the laser glass fiber 20.

The signal light from signal light source 21 is connected to one input port 28a of the coupler 23 by fusion splicing. The pumping source 22 described above is connected to another input port 29a. An output port 29b of the optical coupler 23 may be immersed in matching oil 27 to prevent the pumping light from coming back. Another output port 28b of the optical coupler 23 is connected to the laser glass fiber 20 through an optical connecter or the like and introduces the signal light and the pumping light into the fiber 20.

Output light from the laser glass fiber 20 may be led to an optical spectrum analyzer 25 in order to monitor intensity, wavelength and the like of the amplified signal light. It may be also possible to lead output light to the optical spectrum analyzer 25 after a band-pass filter 26 in order to eliminate the pumping light.

Operation of the optical fiber amplifier of FIG. 6 where the signal light is at 1.3 μm region will be briefly explained. Signal light at a wavelength of 1.3 μm region from the an input port 28a is introduced into the laser glass fiber 20 through the optical coupler 23. Simultaneously, pumping light from the pumping source 22 is also introduced into the laser glass fiber 20 through the input port 29a and the coupler 23. This pumping light excites the activating ions contained in the laser glass fiber 20. When the activating ion is $Pr^{3+}$, it is excited to the level $^1G_4$ using pumping light 1.02 μm in wavelength. The $Pr^{3+}$ ion then being stimulated by the signal light emit amplified light at a wavelength of 1.3 μm region corresponding to the transition of $^1G_4$ to $^3H_5$.

Though the operation of the optical fiber amplifier was explained by referring to an example utilizing signal light of a wavelength at 1.3 μm region, optical fiber amplifiers for other wavelengths may be constructed by using laser glass fibers comprising core glass which contains activating ions having an emission spectra matched with a wavelength of signal light.

Wavelength of the pumping light can be suitably decided depending on kinds of the activating ions or the sensitizing ions. For example, when the activating ions are Dy ions, pumping light at 1.25 μm or 0.89 μm can be used.

Further, instead of the optical coupler 23 described above, a half mirror or the like may be used as a means for introducing the pumping light and the signal light into the laser glass fiber 20.

EXAMPLES

The present invention will be further explained hereinafter by referring to the following working examples, but the present invention is not limited to them.

Example 1

Starting materials of $Ga_2S_3$, $Na_2S$ and $Pr_2S_3$ were weighed and mixed so that resulting mixture had a composition shown in Table 1. A 5 g batch of the mixture was melted by heating at 950° C. for 1 hour under nitrogen atmosphere in a carbon crucible. The crucible was taken out from a furnace and slowly quenched to room temperature as it was to obtain a glass disk having a diameter of about 15 mm and a thickness of about 3 mm.

Stability of the glass with respect to crystallization was evaluated by differential scanning calorimetory (DSC) measurement which was carried out at a heating rate of 10° C./minute under argon gas atmosphere using as a sample about 35 mg of glass pieces obtained by crushing a part of the glass. As a result, it was found that the glass of Example 1 had a glass transition temperature (Tg) of 470° C., crystallization starting temperature (Tx) of 572° C. and hence ΔT=Tx−Tg of 102° C.

Figure 1:
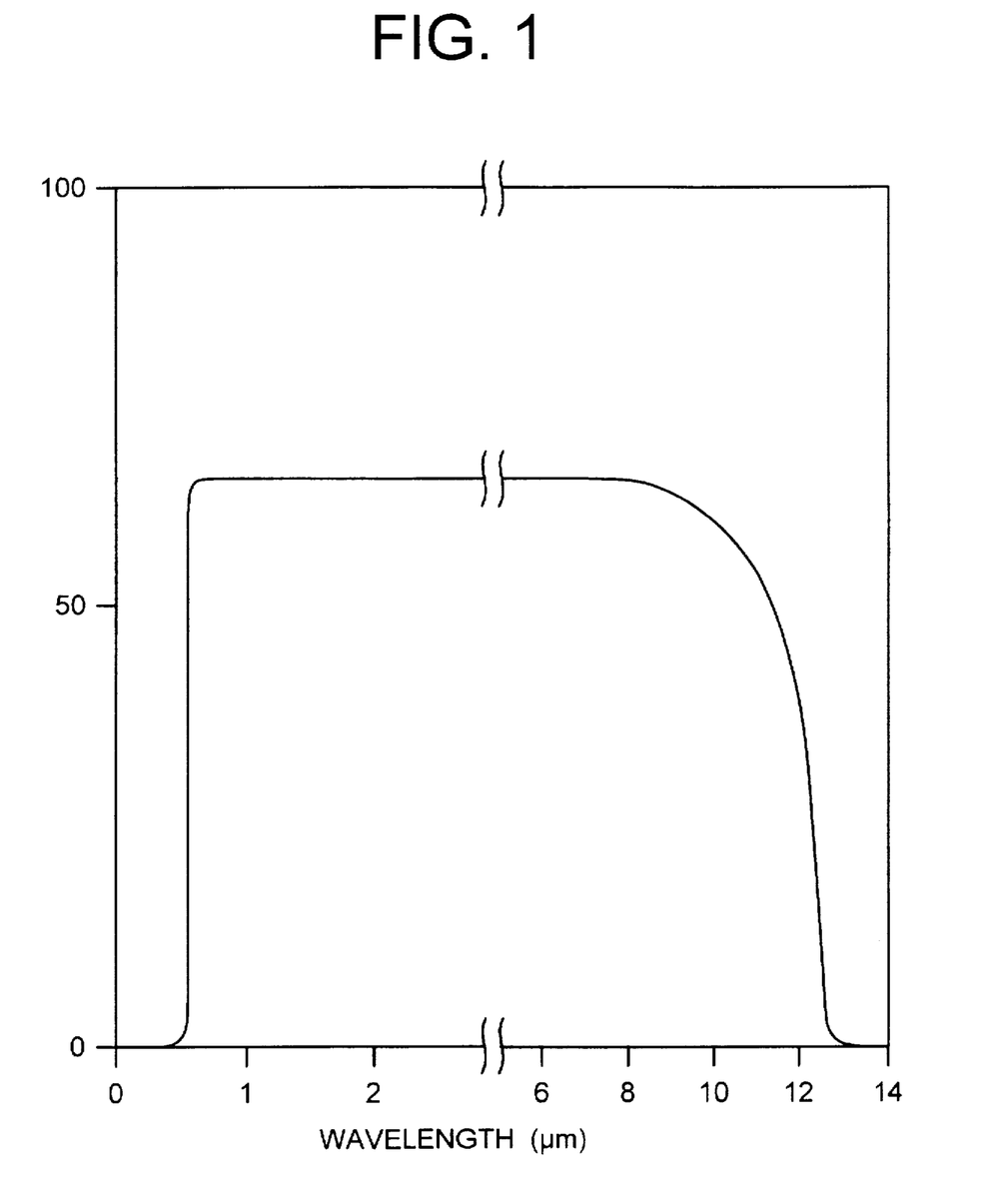
FIG. 1 shows transmission spectra of the laser glass according to the present invention of Example 1.

A part of the glass obtained above was shaped into a piece of 8 mm×8 mm×3 mm. Both surfaces of the piece were polished and a transmission spectra was measured. The result is shown in FIG. 1. As shown in FIG. 1, it was confirmed that the glass had light transmission up to around 12.5 μm. Raman scattering spectrum analysis of the piece was also performed and it was confirmed that the spectrum had a peak around 400 cm$^{-1}$ and it had small maximum phonon energy.

Example 2

Figure 2:
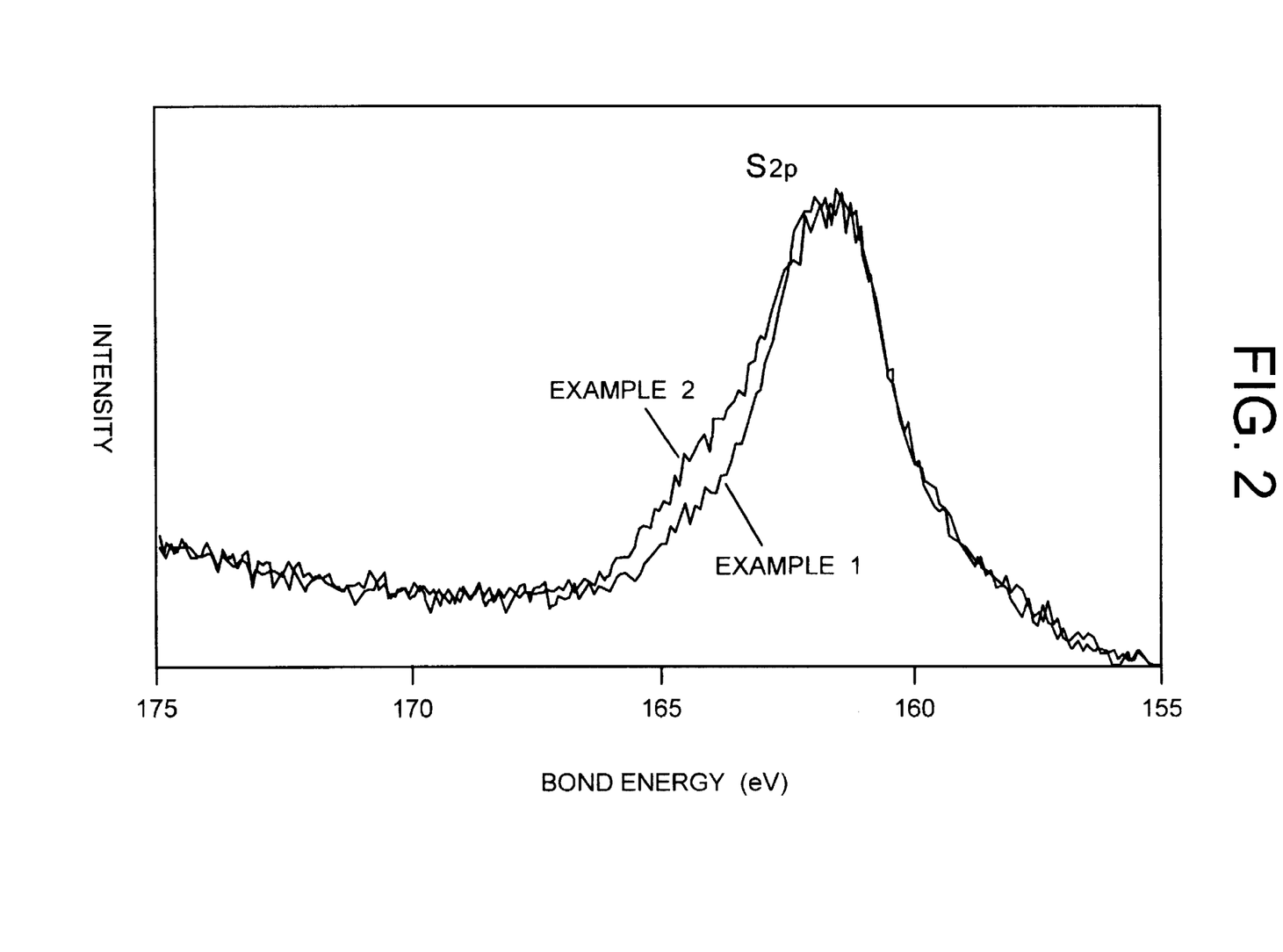
FIG. 2 shows X-ray photoelectron spectra of the laser glasses according to the present invention of Examples 1 and 2.

A glass of the present invention was produced in the same manner as in Example 1 except that the atmosphere was nitrogen gas containing 4% of $Cl_2$ gas. As a result of DSC analysis of this glass, it was confirmed that it had a ΔT of 122° C., i.e., stability was improved compared to the glass of Example 1. Further, X-ray photoelectron spectrum of the glass, which is shown in FIG. 2, shows a shoulder around 164 eV due to increase of Ga—S bonds and it was confirmed that reduction of Ga ions were suppressed compared with the glass of Example 1. Raman scattering spectrum analysis of the glass performed in the same manner as in Example 1 confirmed that the spectrum had a peak around 400 cm$^{-1}$.

Example 3

A glass of the present invention was produced in the same manner as in Example 1 except that the atmosphere was nitrogen gas containing 20% of hydrogen sulfide gas. Fluorescence lifetime of this glass was determined and it was found to have a fluorescence lifetime of 345 to 355 μs. Thus, it was confirmed that non-radiative relaxation rate was decreased and radiative quantum efficiency was increased.

Examples 4 to 15

Glasses of the present invention were produced in the same manner as in Example 2 except that starting materials selected from $Ga_2S_3$, $Na_2S$, $Pr_2S_3$, $Nd_2S_3$, $Sm_2S_3$, $Eu_2S_3$, $Tb_2S_3$, $Dy_2S_3$, $Ho_2S_3$, $Er_2S_3$, $Tm_2S_3$ and $Yb_2S_3$ were used and the glasses were produced so that they had compositions shown in Tables 1 and 2.

As a result, it was confirmed that glasses of Ga—Na—S can contain large amount of rare earth ions and they show high solubility. Raman scattering spectrum analysis was performed with respect to some of the glasses of these Examples. Results are shown in Tables 1 and 2. It was confirmed that all of them had a peak around 400 cm$^{-1}$.

Examples 16 and 17

Glasses of the present invention were produced in the same manner as in Example 2 except that starting materials selected from $Ga_2S_3$, $Na_2S$, $Pr_2S_3$ and $PrCl_3$ were used and the glass were produced so that they had compositions shown in Table 3.

As a result, it was confirmed that the glass of Example 17 containing S and Cl as anions showed a larger value of ΔT compared with the glass of Example 16 containing S alone as anions, i.e., it was confirmed that glass stability can be improved by adding Cl as anions.

Examples 18 to 59

Glasses of the present invention were produced in the same manner as in Example 2 except that starting materials selected from $Ga_2S_3$, $Na_2S$, $Pr_2S_3$, $Li_2S$, $K_2S$, MgS, CaS, SrS, BaS, ZnS, CdS, SnS, PbS, $Y_2S_3$, $La_2S_3$, $Ce_2S_3$, $Gd_2S_3$, $Lu_2S_3$, $Al_2S_3$, $In_2S_3$, $TiS_2$, $ZrS_2$, $SiS_2$ and $GeS_2$ were used and the glasses were produced so that they had compositions shown in Tables 3 to 9.

As a result, it was confirmed that the glasses added with Li, K, Ca, Sr, Cd, Sn, Pb, La, Ce, Gd, Lu or Ge showed a larger value of ΔT compared with the glass of Example 2, i.e., glass stability was improved. Raman scattering spectrum analysis was performed with respect to some of the glasses of these Examples and it was confirmed that all of them had a peak around 400 cm$^{-1}$.

TABLE 1

| Example | 1 | 2 | 3 | 4 | 5 | 6 | 7 |
|---|---|---|---|---|---|---|---|
| $GaS_{3/2}$ | 65.96 | 65.96 | 65.96 | 55.00 | 75.00 | 60.00 | 66.00 |
| $NaS_{1/2}$ | 33.98 | 33.98 | 33.98 | 30.00 | 20.00 | 5.00 | 24.00 |
| $PrS_{3/2}$ | 0.06 | 0.06 | 0.06 | 15.00 | 5.00 | 35.00 | |
| $NdS_{3/2}$ | | | | | | | 10.00 |
| $SmS_{3/2}$ | | | | | | | |
| $EuS_{3/2}$ | | | | | | | |
| $TbS_{3/2}$ | | | | | | | |
| $DyS_{3/2}$ | | | | | | | |
| $HoS_{3/2}$ | | | | | | | |
| $ErS_{3/2}$ | | | | | | | |
| $TmS_{3/2}$ | | | | | | | |
| $YbS_{3/2}$ | | | | | | | |
| Total | 100.00 | 100.00 | 100.00 | 100.00 | 100.00 | 100.00 | 100.00 |
| S | 100 | 100 | 100 | 100 | 100 | 100 | 100 |
| Cl | 0 | 0 | 0 | 0 | 0 | 0 | 0 |
| ΔT (°C.) (Tx − Tg) | 102 | 122 | 110 | 127 | 125 | 136 | 134 |
| Raman scattering peak wave number (cm$^{-1}$) | 400 | 400 | 400 | | | 400 | 400 |
| Fluorescence lifetime ($Pr^{3+}$;$^1G_4 \rightarrow {}^3H_5$) | 345 | 345 | 355 | | | | — |

TABLE 2

| Example | 8 | 9 | 10 | 11 | 12 | 13 | 14 | 15 |
|---|---|---|---|---|---|---|---|---|
| $GaS_{3/2}$ | 66.00 | 66.00 | 66.00 | 66.00 | 66.00 | 66.00 | 66.00 | 66.00 |
| $NaS_{1/2}$ | 24.00 | 24.00 | 24.00 | 24.00 | 24.00 | 24.00 | 24.00 | 24.00 |
| $PrS_{3/2}$ | | | | | | | | |
| $NdS_{3/2}$ | | | | | | | | |
| $SmS_{3/2}$ | 10.00 | | | | | | | |
| $EuS_{3/2}$ | | 10.00 | | | | | | |
| $TbS_{3/2}$ | | | 10.00 | | | | | |
| $DyS_{3/2}$ | | | | 10.00 | | | | |
| $HoS_{3/2}$ | | | | | 10.00 | | | |
| $ErS_{3/2}$ | | | | | | 10.00 | | |
| $TmS_{3/2}$ | | | | | | | 10.00 | |
| $YbS_{3/2}$ | | | | | | | | 10.00 |
| Total | 100.00 | 100.00 | 100.00 | 100.00 | 100.00 | 100.00 | 100.00 | 100.00 |
| S | 100 | 100 | 100 | 100 | 100 | 100 | 100 | 100 |
| Cl | 0 | 0 | 0 | 0 | 0 | 0 | 0 | 0 |
| $\Delta T$ (°C.) (Tx − Tg) | 134 | 135 | 132 | 134 | 132 | 134 | 130 | 128 |
| Raman scattering peak wave number ($cm^{-1}$) | | | | | 400 | | | |
| Fluorescence lifetime ($Pr^{3+}$; $^1G_4 \to {}^3H_5$) | — | — | — | — | — | — | — | — |

TABLE 3

| Example | 16 | 17 | 18 | 19 | 20 | 21 | 22 |
|---|---|---|---|---|---|---|---|
| $GaS_{3/2}$ | 66.00 | 66.00 | 59.36 | 56.06 | 56.06 | 52.76 | 62.66 |
| $NaS_{1/2}$ | 29.00 | 29.00 | 30.58 | 28.88 | 28.88 | 27.18 | 32.28 |
| $PrS_{3/2}$ | 5.00 | | 0.06 | 0.06 | 0.06 | 0.06 | 0.06 |
| $PrCl_3$ | | 5.00 | | | | | |
| $LiS_{1/2}$ | | | 10.00 | 15.00 | | | |
| $KS_{1/2}$ | | | | | 15.00 | 20.00 | |
| MgS | | | | | | | 5.00 |
| CaS | | | | | | | |
| SrS | | | | | | | |
| BaS | | | | | | | |
| Total | 100.00 | 100.00 | 100.00 | 100.00 | 100.00 | 100.00 | 100.00 |
| S | 100 | 88.9 | 100 | 100 | 100 | 100 | 100 |
| Cl | 0 | 11.1 | 0 | 0 | 0 | 0 | 0 |
| $\Delta T$ (°C.) (Tx − Tg) | 130 | 136 | 138 | 130 | 140 | 135 | 120 |
| Raman scattering peak wave number ($cm^{-1}$) | | 400 | | | | | |
| Fluorescence lifetime ($Pr^{3+}$; $^1G_4 \to {}^3H_5$) | | | 340 | | 335 | | 340 |

TABLE 4

| Example | 23 | 24 | 25 | 26 | 27 | 28 | 29 |
|---|---|---|---|---|---|---|---|
| $GaS_{3/2}$ | 59.36 | 59.36 | 56.06 | 59.36 | 56.06 | 62.66 | 59.36 |
| $NaS_{1/2}$ | 30.58 | 30.58 | 28.88 | 30.58 | 28.88 | 32.28 | 30.58 |
| $PrS_{3/2}$ | 0.06 | 0.06 | 0.06 | 0.06 | 0.06 | 0.06 | 0.06 |
| $PrCl_3$ | | | | | | | |
| $LiS_{1/2}$ | | | | | | | |
| $KS_{1/2}$ | | | | | | | |

TABLE 4-continued

| Example | 23 | 24 | 25 | 26 | 27 | 28 | 29 |
|---|---|---|---|---|---|---|---|
| MgS | 10.00 | | | | | | |
| CaS | | 10.00 | 15.00 | | | | |
| SrS | | | | 10.00 | 15.00 | | |
| BaS | | | | | | 5.00 | 10.00 |
| Total | 100.00 | 100.00 | 100.00 | 100.00 | 100.00 | 100.00 | 100.00 |
| S | 100 | 100 | 100 | 100 | 100 | 100 | 100 |
| Cl | 0 | 0 | 0 | 0 | 0 | 0 | 0 |
| $\Delta T$ (°C.) (Tx − Tg) | 106 | 146 | 128 | 143 | 126 | 134 | 122 |
| Raman scattering peak wave number ($cm^{-1}$) | | 400 | | | | | |
| Fluorescence lifetime ($Pr^{3+}$; $^1G_4 \to {}^3H_5$) | | 340 | | 340 | | 340 | |

TABLE 5

| Example | 30 | 31 | 32 | 33 | 34 | 35 | 36 |
|---|---|---|---|---|---|---|---|
| $GaS_{3/2}$ | 62.66 | 59.36 | 59.36 | 56.06 | 59.36 | 56.06 | 59.36 |
| $NaS_{1/2}$ | 32.28 | 30.58 | 30.58 | 28.88 | 30.58 | 28.88 | 30.58 |
| $PrS_{3/2}$ | 0.06 | 0.06 | 0.06 | 0.06 | 0.06 | 0.06 | 0.06 |
| ZnS | 5.00 | 10.00 | | | | | |
| CdS | | | 10.00 | 15.00 | | | |
| SnS | | | | | 10.00 | 15.00 | |
| PbS | | | | | | | 10.00 |
| $YS_{3/2}$ | | | | | | | |
| $LaS_{3/2}$ | | | | | | | |
| $CeS_{3/2}$ | | | | | | | |
| Total | 100.00 | 100.00 | 100.00 | 100.00 | 100.00 | 100.00 | 100.00 |
| S | 100 | 100 | 100 | 100 | 100 | 100 | 100 |
| Cl | 0 | 0 | 0 | 0 | 0 | 0 | 0 |
| $\Delta T$ (°C.) (Tx − Tg) | 124 | 117 | 143 | 133 | 139 | 127 | 136 |
| Raman scattering peak wave number ($cm^{-1}$) | | | 400 | | 400 | | |
| Fluorescence lifetime ($Pr^{3+}$; $^1G_4 \to {}^3H_5$) | 340 | | 345 | | 340 | | 340 |

TABLE 6

| Example | 37 | 38 | 39 | 40 | 41 | 42 | 43 |
|---|---|---|---|---|---|---|---|
| $GaS_{3/2}$ | 56.06 | 62.66 | 59.36 | 65.96 | 58.96 | 65.96 | 58.96 |
| $NaS_{1/2}$ | 28.88 | 32.28 | 30.58 | 13.98 | 5.98 | 13.98 | 5.98 |
| $PrS_{3/2}$ | 0.06 | 0.06 | 0.06 | 0.06 | 0.06 | 0.06 | 0.06 |
| ZnS | | | | | | | |
| CdS | | | | | | | |
| SnS | | | | | | | |
| PbS | 15.00 | | | | | | |
| $YS_{3/2}$ | | 5.00 | 10.00 | | | | |
| $LaS_{3/2}$ | | | | 20.00 | 35.00 | | |
| $CeS_{3/2}$ | | | | | | 20.00 | 35.00 |
| Total | 100.00 | 100.00 | 100.00 | 100.00 | 100.00 | 100.00 | 100.00 |
| S | 100 | 100 | 100 | 100 | 100 | 100 | 100 |
| Cl | 0 | 0 | 0 | 0 | 0 | 0 | 0 |
| $\Delta T$ (°C.) (Tx − Tg) | 125 | 119 | 107 | 143 | 135 | 139 | 128 |
| Raman scattering | | | | 400 | | | |

TABLE 6-continued

| Example | 37 | 38 | 39 | 40 | 41 | 42 | 43 |
|---|---|---|---|---|---|---|---|
| peak wave number (cm$^{-1}$) | | | | | | | |
| Fluorescence lifetime (Pr$^{3+}$; $^1G_4 \to {}^3H_5$) | | 340 | | 345 | | 345 | |

TABLE 7

| Example | 44 | 45 | 46 | 47 | 48 | 49 | 50 |
|---|---|---|---|---|---|---|---|
| GaS$_{3/2}$ | 65.96 | 65.96 | 65.96 | 65.96 | 62.66 | 59.36 | 62.66 |
| NaS$_{1/2}$ | 23.98 | 18.98 | 28.98 | 23.98 | 32.28 | 30.58 | 32.28 |
| PrS$_{3/2}$ | 0.06 | 0.06 | 0.06 | 0.06 | 0.06 | 0.06 | 0.06 |
| GdS$_{3/2}$ | 10.00 | 15.00 | | | | | |
| LuS$_{3/2}$ | | | 5.00 | 10.00 | | | |
| AlS$_{3/2}$ | | | | | 5.00 | 10.00 | |
| InS$_{3/2}$ | | | | | | | 5.00 |
| TiS$_2$ | | | | | | | |
| ZrS$_2$ | | | | | | | |
| SiS$_2$ | | | | | | | |
| Total | 100.00 | 100.00 | 100.00 | 100.00 | 100.00 | 100.00 | 100.00 |
| S | 100 | 100 | 100 | 100 | 100 | 100 | 100 |
| Cl | 0 | 0 | 0 | 0 | 0 | 0 | 0 |
| ΔT (°C.) (Tx − Tg) | 133 | 119 | 132 | 120 | 120 | 109 | 117 |
| Raman scattering peak wave number (cm$^{-1}$) | | | | | | | |
| Fluorescence lifetime (Pr$^{3+}$; $^1G_4 \to {}^3H_5$) | 340 | | 340 | | 340 | | 340 |

TABLE 8

| Example | 51 | 52 | 53 | 54 | 55 | 56 | 57 |
|---|---|---|---|---|---|---|---|
| GaS$_{3/2}$ | 59.36 | 62.66 | 59.36 | 62.66 | 59.36 | 62.66 | 59.36 |
| NaS$_{1/2}$ | 30.58 | 32.28 | 30.58 | 32.28 | 30.58 | 32.28 | 30.58 |
| PrS$_{3/2}$ | 0.06 | 0.06 | 0.06 | 0.06 | 0.06 | 0.06 | 0.06 |
| GdS$_{3/2}$ | | | | | | | |
| LuS$_{3/2}$ | | | | | | | |
| AlS$_{3/2}$ | | | | | | | |
| InS$_{3/2}$ | 10.00 | | | | | | |
| TiS$_2$ | | 5.00 | 10.00 | | | | |
| ZrS$_2$ | | | | 5.00 | 10.00 | | |
| SiS$_2$ | | | | | | 5.00 | 10.00 |
| Total | 100.00 | 100.00 | 100.00 | 100.00 | 100.00 | 100.00 | 100.00 |
| S | 100 | 100 | 100 | 100 | 100 | 100 | 100 |
| Cl | 0 | 0 | 0 | 0 | 0 | 0 | 0 |
| ΔT (°C.) (Tx − Tg) | 104 | 113 | 102 | 116 | 110 | 117 | 100 |
| Raman scattering peak wave number (cm$^{-1}$) | | 400 | | | | 400 | |
| Fluorescence lifetime (Pr$^{3+}$; $^1G_4 \to {}^3H_5$) | | 340 | | 340 | | 340 | |

TABLE 9

| Example | 58 | 59 | 60 Core | Clad |
|---|---|---|---|---|
| GaS$_{3/2}$ | 59.36 | 56.06 | 61.22 | 61.27 |
| NaS$_{1/2}$ | 30.58 | 28.88 | 16.91 | 16.93 |
| PrS$_{3/2}$ | 0.06 | 0.06 | 0.08 | — |
| GeS$_2$ | 10.00 | 15.00 | | |
| LaS$_{3/2}$ | | | 13.79 | 13.80 |
| GaS | | | 2.40 | 4.00 |
| CdS | | | 5.60 | 4.00 |
| Total | 100.00 | 100.00 | 100.00 | 100.00 |
| S | 100 | 100 | 100 | 100 |
| Cl | 0 | 0 | 0 | 0 |
| ΔT (°C.) (Tx − Tg) | 140 | 138 | 150 | 148 |
| Raman scattering peak wave number (cm$^{-1}$) | | | 400 | |
| Fluorescence lifetime (Pr$^{3+}$;[1] G$_4$ →[3] H$_5$) | 335 | | 320 | |

Example 60

20 g of glass having the composition for core indicated in Table 9 was produced in the same manner as in Example 2. Five glass plates each weighed 50 g and having the composition for clad indicated in Table 9 were produced in the same manner as in Example 2. Preforms were produced by an extrusion molding technique using these glasses. Detail of the production was as follows.

Figure 3:
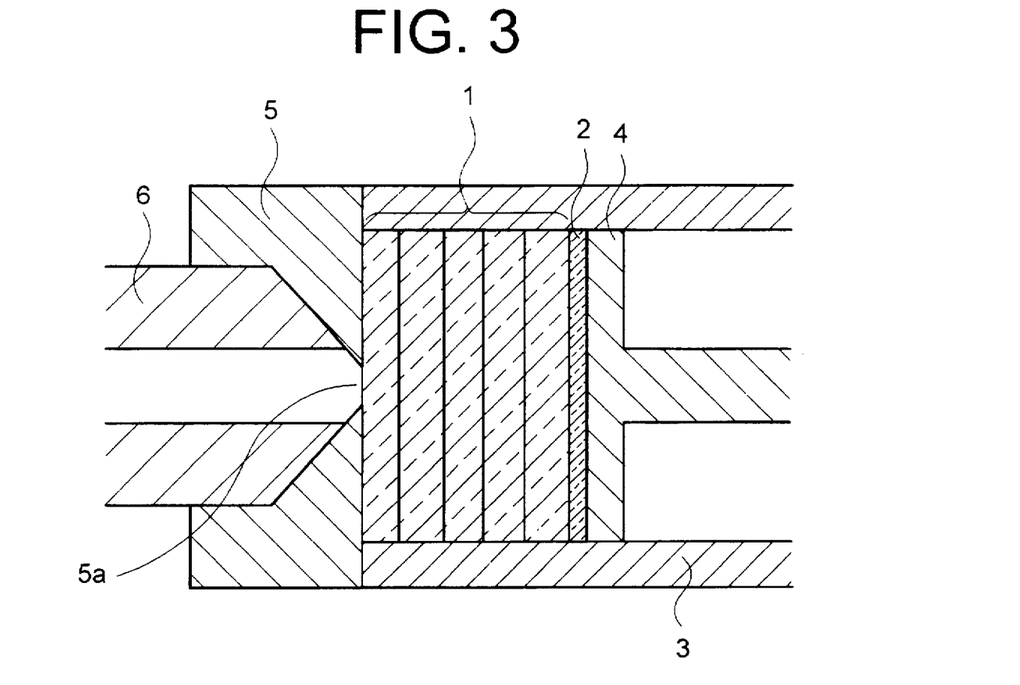
FIG. 3 illustrates an extrusion molding machine used for molding glass preforms wherein glass for core and glass for clad are mounted.
Figure 4:
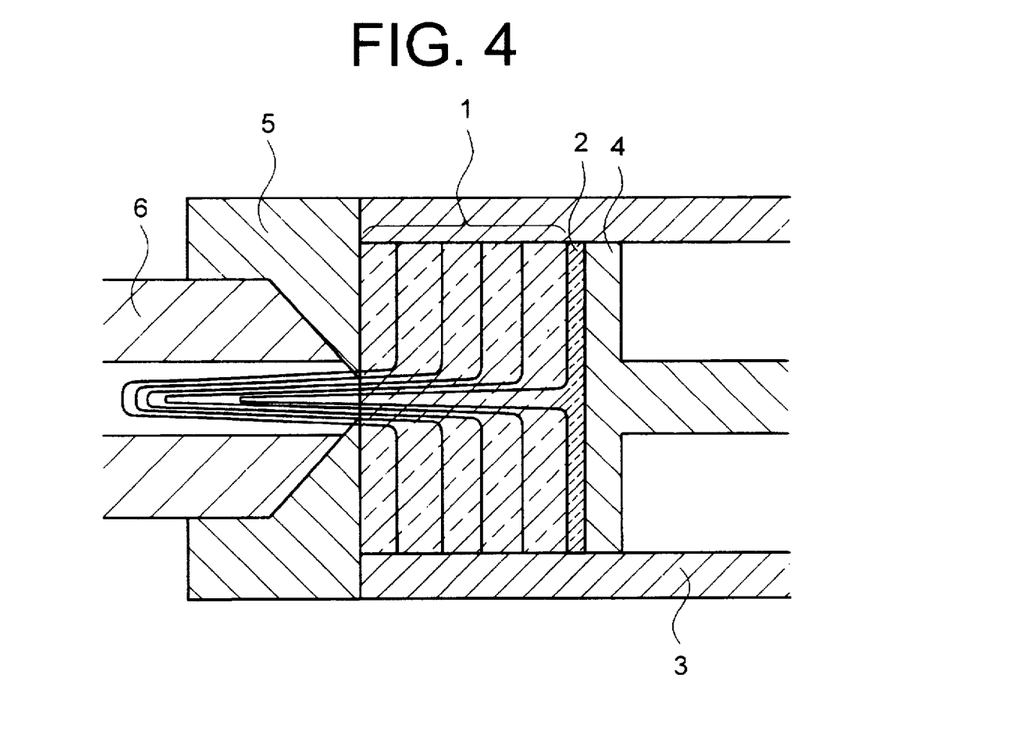
FIG. 4 illustrates an extrusion molding machine used for molding glass preforms wherein glasses are being extruded.

Preforms were produced in an extrusion molding machine shown in FIGS. 3 and 4. First, both surfaces of the five clad glasses 1 and a surface (one side) of the core glass 2 were polished to a surface precision of more than λ/2 and polished surfaces of the glasses are optically contacted in a clean booth. Then, the glasses 1 and 2 were introduced into a cylinder 3 having an inner diameter of about 35 mm so that the core glass 2 is positioned on the side of a punch 4 and heated to 490° C. Pressure of 500 bar was applied to the punch 4 as shown in FIG. 4 and a glass rod having a two-layer structure was extruded from a hole 5a having a diameter of 5 mm, which was provided on a molding section 5, along a liner section 6 to produce a preform.

The obtained preform had a clad diameter of 5.4 mm, core diameter of 0.17 mm and length of 120 mm.

The above-obtained preform was subjected to be drawn into fiber having an outer diameter of 125 μm. The fiber had a length of 8 m, core diameter of 4 μm, difference of refractive index between core and clad (Δn) of 0.5% and cut off wavelength of 1 μm.

Figure 5:
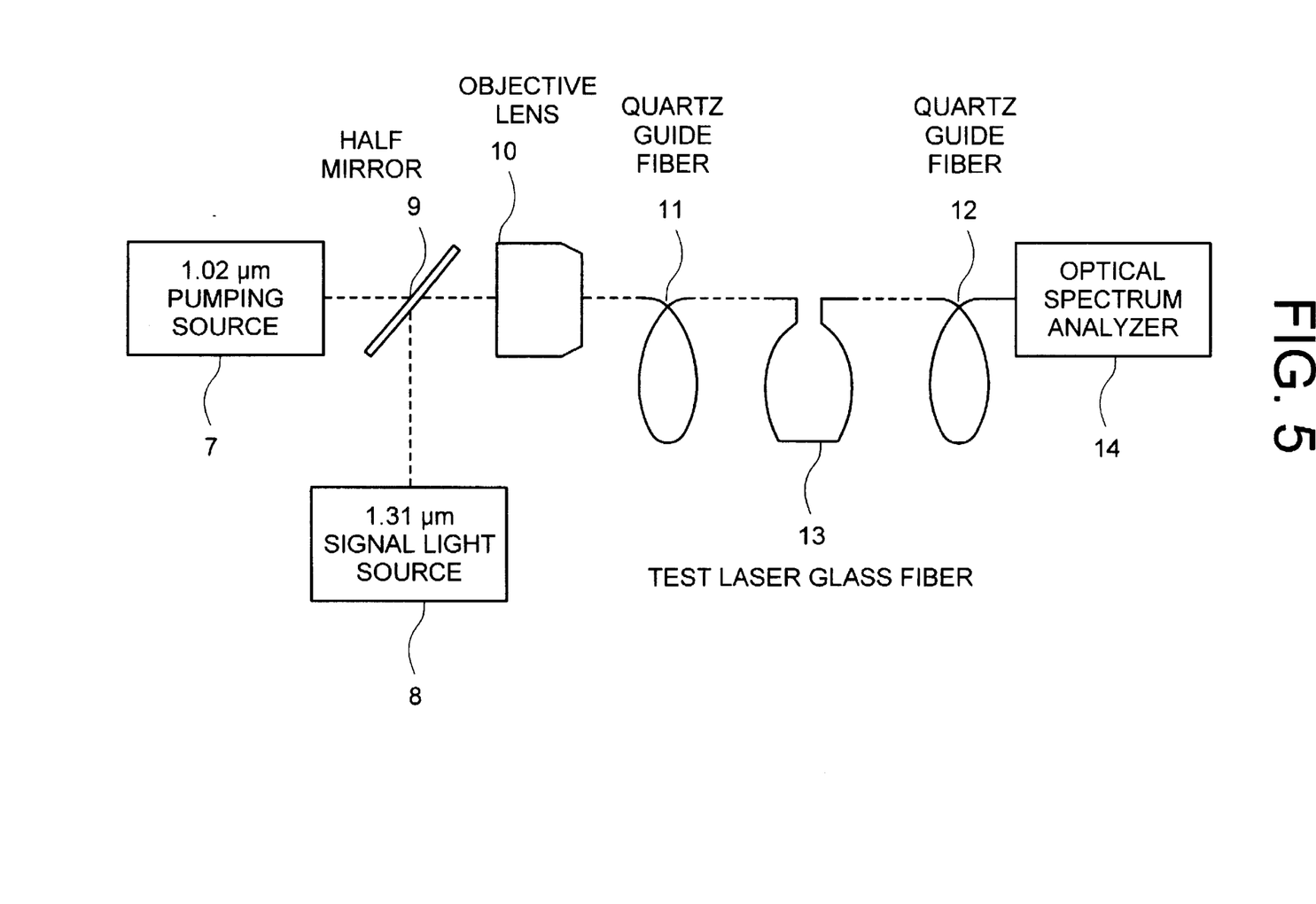
FIG. 5 illustrates the optical fiber amplifier according to the present invention of Example 60 and that of Comparative Example 1.

Optical amplification characteristics at 1.3 μm region of this fiber were determined by an apparatus schematically shown in FIG. 5. The reference numbers in this figure are used for indicating the followings: 7 for a pumping source at 1.02 μm, 8 for a signal light source at 1.31 μm, 9 for a half mirror acting as an optical coupler, 10 for an objective lens, 11 and 12 for quartz guide fibers for pumping light and signal light, 13 for test laser glass fiber and 14 for optical spectrum analyzer.

The broken line in this figure schematically represents a path of lights (pumping light and signal light).

Gain measurement was carried out as follows. The signal light at 1.31 μm from the signal light source 8 and the pumping light at 1.02 μm from the pumping source 7 are multiplexed through the half mirror, focused by the objective lens 10 and injected into the quartz guide fiber 11. By contacting an end of this quartz guide fiber 11 with the end surface of the test laser glass fiber 13, the signal light and the pumping light can be simultaneously injected into the test laser glass fiber 13. Optical output from the test laser glass fiber 13 is guided by the quartz guide fiber 12, whose one end is contacted with the end of the test laser glass fiber 13, and monitored by the optical spectrum analyzer 14. Intensity, wavelength and the like of the signal light are determined by the optical spectrum analyzer 14. Signal light intensities upon on- and off-states of the pumping light were measured and gain was calculated.

As a result of this measurement, it was found that, with 100 mW of the pumping light input, 8 dB of optical amplification at 1.3 μm was obtained.

Comparative Example 1

For comparison with Example 60, a laser glass fiber was produced in the same manner by using ZBLAN (ZrF$_4$—BaF$_2$—LaF$_3$—AlF$_3$—NaF) fluoride glass doped with 0.04 mol % of PrF$_3$ as core glass. Compositions of the core glass and the clad glass used were as follows:

| | Core glass | Clad glass |
|---|---|---|
| ZrF$_4$ | 51 | 39.75 |
| HfF$_4$ | — | 13.25 |
| BaF$_2$ | 23 | 18 |
| LaF$_2$ | 4 | 4 |
| AlF$_3$ | 3 | 3 |
| NaF | 18 | 22 |
| PbF$_2$ | 1 | — |
| PrF$_3$ | 0.04 | — |

The fiber had an outer diameter of 125 μm, core diameter of 4 μm, difference of refractive index between core and clad (Δn) of 0.8%, length of 8 m and cut off wavelength of 1 μm. Gain characteristics at 1.31 μm region of this fiber was determined in the same manner as in Example 60 and it was found that only 3.5 dB of gain was obtained with input of 100 mW.

As clearly seen from comparison of Example 60 and Comparative Example 1, it was confirmed that, in the laser glass of the present invention, non-radiative relaxation rate of the activating ions of rare earth ions is suppressed and radiative quantum efficiency is enhanced.

As explained above, the glasses of the present invention have higher uniformity compared with conventional chalcogenide glasses because of high solubility of activating ions such as rare earth ions therein and, since they can be produced in a globe box like fluoride glasses, they can be easily produced. In addition, they show higher radiative quantum efficiency compared to hitherto known ZrF$_4$ glasses since they have a smaller maximum phonon energy and hence they can be used as visible to infrared laser materials, in particular, as optical fiber amplifiers at 1.3 μm region.

What is claimed is:

1. A laser glass composed of a Ga—Na—S glass doped with one or more activating ions, wherein the glass does not contain La or Ge.

2. A laser glass of claim 1 wherein the activating ions are ions of one or more elements selected from the group consisting of Pr, Nd, Sm, Eu, Tb, Dy, Ho, Er, Tm and Yb.

3. A laser glass of claim 2 which contains one or more of sensitizing ions for sensitizing the activating ions.

4. A laser glass of claim 2 which further contains cations constituting the glass mentioned below whose amounts are indicated in mol %:
Li: 0–17%, K: 0–22%,
Mg: 0–12%, Ca: 0–17%, Sr: 0–17%,
Ba: 0–12%, Zn: 0–12%, Cd: 0–17%,
Sn: 0–17%, Pb: 0–17%,
Y: 0–12%, Ce: 0–37%,
Gd: 0–17%, Lu: 0–12%, Al: 0–12%,
In: 0–12%,
Ti: 0–12%, Zr: 0–12%, Si: 0–12%,
wherein total content of the above cations is 0.01 to 45 mol %, provided that total content of Ga, Na and the activating ions or Ga, Na, the activating ions and one or more sensitizing ions for sensitizing the activating ions is 100 mol %.

5. A laser glass of claim 4 which contains one or more of sensitizing ions for sensitizing the activating ions.

6. A laser glass fiber comprising a core and a clad wherein the core is composed of a laser glass of claim 4.

7. An optical fiber amplifier comprising a pumping source, a laser glass fiber and a means for introducing pumping light and signal light into the laser glass fiber, said laser glass fiber comprising a core and a clad wherein said core comprises a Ga—Na—S glass doped with one or more activating ions, and wherein the laser glass fiber is a laser glass fiber of claim 6.

8. A laser glass fiber comprising a core and a clad wherein the core is composed of a laser glass of claim 3.

9. An optical fiber amplifier comprising a pumping source, a laser glass fiber and a means for introducing pumping light and signal light into the laser glass fiber, said laser glass fiber comprising a core and a clad wherein said core comprises a Ga—Na—S glass doped with one or more activating ions, and wherein the laser glass fiber is a laser glass fiber of claim 8.

10. A laser glass of claim 2 which further contains cations constituting the glass mentioned below whose amounts are indicated in mol %:
Li: 0–12%, K: 0–17%,
Mg: 0–7%, Ca: 0–12%, Sr: 0–12%,
Ba: 0–7%, Zn: 0–7%, Cd: 0–12%,
Sn: 0–12%, Pb: 0–12%,
Y: 0–7%, Ce: 0–30%,
Gd: 0–12%, Lu: 0–7%, Al: 0–7%,
In: 0–7 %,
Ti: 0–7%, Zr: 0–7%, Si: 0–7%,
wherein total content of the above cations is 5 to 40 mol %, provided that total content of Ga, Na and the activating ions or Ga, Na, the activating ions and one or more sensitizing ions for sensitizing the activating ions is 100 mol %.

11. A laser glass of claim 10 which contains one or more of sensitizing ions for sensitizing the activating ions.

12. A laser glass fiber comprising a core and a clad wherein the core is composed of a laser glass of claim 2.

13. An optical fiber amplifier comprising a pumping source, a laser glass fiber and a means for introducing pumping light and signal light into the laser glass fiber, said laser glass fiber comprising a core and a clad wherein said core comprises a Ga—Na—S glass doped with one or more activating ions, and wherein the laser glass fiber is a laser glass fiber of claim 12.

14. A laser glass of claim 1 which contains one or more of sensitizing ions for sensitizing the activating ions.

15. A laser glass fiber comprising a core and a clad wherein the core is composed of a laser glass of claim 14.

16. An optical fiber amplifier comprising a pumping source, a laser glass fiber and a means for introducing pumping light and signal light into the laser glass fiber, said laser glass fiber comprising a core and a clad wherein said core comprises a Ga—Na—S glass doped with one or more activating ions, and wherein the laser glass fiber is a laser glass fiber of claim 15.

17. A laser glass of claim 1 which further contains cations constituting the glass mentioned below whose amounts are indicated in mol %:
Li: 0–17%, K: 0–22%,
Mg: 0–12%, Ca: 0–17%, Sr: 0–17%,
Ba: 0–12%, Zn: 0–12%, Cd: 0–17%,
Sn: 0–17%, Pb: 0–17%,
Y: 0–12%, Ce: 0–37%,
Gd: 0–17%, Lu: 0–12%, Al: 0–12%,
In: 0–12%,
Ti: 0–12%, Zr: 0–12%, Si: 0–12%,
wherein total content of the above cations is 0.01 to 45 mol %, provided that total content of Ga, Na and the activating ions or Ga, Na, the activating ions and one or more sensitizing ions for sensitizing the activating ions is 100 mol %.

18. A laser glass of claim 17 which contains one or more of sensitizing ions for sensitizing the activating ions.

19. A laser glass fiber comprising a core and a clad wherein the core is composed of a laser glass of claim 17.

20. An optical fiber amplifier comprising a pumping source, a laser glass fiber and a means for introducing pumping light and signal light into the laser glass fiber, said laser glass fiber comprising a core and a clad wherein said core comprises a Ga—Na—S glass doped with one or more activating ions, and wherein the laser glass fiber is a laser glass fiber of claim 19.

21. A laser glass of claim 1 which further contains cations constituting the glass mentioned below whose amounts are indicated in mol %:
Li: 0–12%, K: 0–17%,
Mg: 0–7%, Ca: 0–12%, Sr: 0–12%,
Ba: 0–7%, Zn: 0–7%, Cd: 0–12%,
Sn: 0–12%, Pb: 0–12%,
Y: 0–7%, Ce: 0–30%,
Gd: 0–12%, Lu: 0–7%, Al: 0–7%,
In: 0–7%,
Ti: 0–7%, Zr: 0–7%, Si: 0–7%,
wherein total content of the above cations is 5 to 40 mol %, provided that total content of Ga, Na and the activating ions or Ga, Na, the activating ions and one or more sensitizing ions for sensitizing the activating ions is 100 mol %.

22. A laser glass of claim 21 which contains one or more of sensitizing ions for sensitizing the activating ions.

23. A laser glass fiber comprising a core and a clad wherein the core is composed of a laser glass of claim 1.

24. An optical fiber amplifier comprising a pumping source, a laser glass fiber and a means for introducing pumping light and signal light into the laser glass fiber, wherein the laser glass fiber is a laser glass fiber of claim 23.

25. A laser glass fiber for 1.3 μm region amplification comprising a core and a clad wherein the core is composed of a laser glass of claim 1 and the laser glass contains ions of one or more elements selected from the group consisting of Pr, Nd, Sm, Dy, Ho and Er as the activating ions.

26. A laser glass fiber of claim 25 wherein the laser glass contains one or more of sensitizing ions for sensitizing the activating ions.

27. A laser glass fiber of claim 25 wherein the laser glass contains 50 to 80 mol % of Ga and 5 to 45 mol % of Na as cations constituting the glass and S or S and Cl as anions constituting the glass wherein the Cl content is 15 mol % or less and total content of the activating ions is 0.01 to 40 mol %, provided that total content of Ga, Na and the activating ions or Ga, Na, the activating ions and one or more sensitizing ions for sensitizing the activating ions is 100 mol %.

28. A laser glass fiber of claim 25 wherein the laser glass further contains cations constituting the glass mentioned below whose amounts are indicated in mol %:
Li: 0–17%, K: 0–22%,
Mg: 0–12%, Ca: 0–17%, Sr: 0–17%,
Ba: 0–12%, Zn: 0–12%, Cd: 0–17%,
Sn: 0–17%, Pb: 0–17%,
Y: 0–12%, Ce: 0–37%,
Gd: 0–17%, Lu: 0–12%, Al: 0–12%,
In: 0–12%,
Ti: 0–12%, Zr: 0–12%, Si: 0–12%,
wherein total content of the above cations is 0.01 to 45 mol %, provided that total content of Ga, Na and the activating ions or Ga, Na, the activating ions and one or more sensitizing ions for sensitizing the activating ions is 100 mol %.

29. A laser glass fiber of claim 25 wherein the laser glass further contains cations constituting the glass mentioned below whose amounts are indicated in mol %:
Li: 0–12%, K: 0–17%,
Mg: 0–7%, Ca: 0–12%, Sr: 0–12%,
Ba: 0–7%, Zn: 0–7%, Cd: 0–12%,
Sn: 0–12%, Pb: 0–12%,
Y: 0–7%, Ce: 0–30%,
Gd: 0–12%, Lu: 0–7%, Al: 0–7%,
In: 0–7%,
Ti: 0–7%, Zr: 0–7% , Si: 0–7%,
wherein total content of the above cations is 5 to 40 mol %, provided that total content of Ga, Na and the activating ions or Ga, Na, the activating ions and one or more sensitizing ions for sensitizing the activating ions is 100 mol %.

30. A laser glass composed of a Ga—Na—S glass doped with one or more activating ions, wherein the glass contains 50 to 80 mol % of Ga and 5 to 45 mol % of Na as cations constituting the glass and S or S and Cl as anions constituting the glass, wherein the Cl content is 15 mol % or less, and total content of the activating ions is 0.01 to 40 mol %, provided that total content of Ga, Na and the activating ions is 100 mol %, wherein the glass does not contain La.

31. A laser glass of claim 30 wherein the activating ions are ions of one or more elements selected from the group consisting of Pr, Nd, Sm, Eu, Tb, Dy, Ho, Er, Tm and Yb.

32. A laser glass of claim 31 wherein the glass contains one or more sensitizing ions for sensitizing the activating ions, provided that total content of Ga, Na, the activating ions and the sensitizing ions is 100 mol %.

33. A laser glass fiber comprising a core and a clad wherein the core is composed of a laser glass of claim 31.

34. An optical fiber amplifier comprising a pumping source, a laser glass fiber and a means for introducing pumping light and signal light into the laser glass fiber, said laser glass fiber comprising a core and a clad wherein said core comprises a Ga—Na—S glass doped with one or more activating ions, and wherein the laser glass fiber is a laser glass fiber of claim 33.

35. A laser glass of claim 31 which further contains cations constituting the glass mentioned below whose amounts are indicated in mol %:
Li: 0–17%, K: 0–22%,
Mg: 0–12%, Ca: 0–17%, Sr: 0–17%,
Ba: 0–12%, Zn: 0–12%, Cd: 0–17%,
Sn: 0–17%, Pb: 0–17%,
Y: 0–12%, Ce: 0–37%,
Gd: 0–17%, Lu: 0–12%, Al: 0–12%,
In: 0–12%,
Ti: 0–12%, Zr: 0–12%, Si: 0–12%,
wherein total content of the above cations is 0.01 to 45 mol %, provided that total content of Ga, Na and the activating ions or Ga, Na, the activating ions and one or more sensitizing ions for sensitizing the activating ions is 100 mol %.

36. A laser glass of claim 31 which further contains cations constituting the glass mentioned below whose amounts are indicated in mol %:
Li: 0–12%, K: 0–17%,
Mg: 0–7%, Ca: 0–12%, Sr: 0–12%,
Ba: 0–7%, Zn: 0–7%, Cd: 0–12%,
Sn: 0–12%, Pb: 0–12%,
Y: 0–7%, Ce: 0–30%,
Gd: 0–12%, Lu: 0–7%, Al: 0–7%,
In: 0–7%,
Ti: 0–7%, Zr: 0–7% , Si: 0–7%,
wherein total content of the above cations is 5 to 40 mol %, provided that total content of Ga, Na and the activating ions or Ga, Na, the activating ions and one or more sensitizing ions for sensitizing the activating ions is 100 mol %.

37. A laser glass of claim 30 wherein the glass contains one or more sensitizing ions for sensitizing the activating ions, provided that total content of Ga, Na, the activating ions and the sensitizing ions is 100 mol %.

38. A laser glass fiber comprising a core and a clad wherein the core is composed of a laser glass of claim 30.

39. An optical fiber amplifier comprising a pumping source, a laser glass fiber and a means for introducing pumping light and signal light into the laser glass fiber, said laser glass fiber comprising a core and a clad wherein said core comprises a Ga—Na—S glass doped with one or more activating ions, and wherein the laser glass fiber is a laser glass fiber of claim 38.

40. A laser glass of claim 30 which further contains cations constituting the glass mentioned below whose amounts are indicated in mol %:
Li: 0–17%, K: 0–22%,
Mg: 0–12%, Ca: 0–17%, Sr: 0–17%,
Ba: 0–12%, Zn: 0–12%, Cd: 0–17%,
Sn: 0–17%, Pb: 0–17%,
Y: 0–12%, Ce: 0–37%,
Gd: 0–17%, Lu: 0–12%, Al: 0–12%,
In: 0–12%,
Ti: 0–12%, Zr: 0–12%, Si: 0–12%,
wherein total content of the above cations is 0.01 to 45 mol %, provided that total content of Ga, Na and the activating ions or Ga, Na, the activating ions and one or more sensitizing ions for sensitizing the activating ions is 100 mol %.

41. A laser glass of claim 30 which further contains cations constituting the glass mentioned below whose amounts are indicated in mol %:
Li: 0–12%, K: 0–17%,
Mg: 0–7%, Ca: 0–12%, Sr: 0–12%,
Ba: 0–7%, Zn: 0–7%, Cd: 0–12%,
Sn: 0–12%, Pb: 0–12%,
Y: 0–7%, Ce: 0–30%,
Gd: 0–12%, Lu: 0–7%, Al: 0–7%,
In: 0–7%,
Ti: 0–7%, Zr: 0–7% , Si: 0–7%,
wherein total content of the above cations is 5 to 40 mol %, provided that total content of Ga, Na and the activating ions or Ga, Na, the activating ions and one or more sensitizing ions for sensitizing the activating ions is 100 mol %.

* * * * *